United States Patent [19]
Sankovic

[11] Patent Number: 5,157,983
[45] Date of Patent: Oct. 27, 1992

[54] LOCKING DEVICE FOR A GEAR TRAIN

[75] Inventor: John R. Sankovic, Chesterland, Ohio

[73] Assignee: Lucas Aerospace Power Equipment Corporation, Aurora, Ohio

[21] Appl. No.: 667,205

[22] Filed: Mar. 11, 1991

[51] Int. Cl.[5] ............................................. F16H 57/10
[52] U.S. Cl. ..................................... 74/411.5; 74/530
[58] Field of Search ............... 74/411.5, 530; 116/281, 116/283, 284, 285; 70/394, 432; 411/14, 403; 52/105

[56] References Cited

U.S. PATENT DOCUMENTS

| | | | |
|---|---|---|---|
| 967,947 | 8/1910 | Maupin et al. | 74/530 |
| 2,220,786 | 11/1940 | Grainger | 70/432 |
| 2,614,520 | 10/1952 | Allen | 116/284 |
| 2,954,849 | 10/1960 | Bigos | 74/530 |
| 4,419,831 | 12/1983 | Zimmer | 116/DIG. 21 X |
| 4,597,476 | 7/1986 | Wenker | 74/411.5 X |
| 4,741,185 | 5/1988 | Weinert et al. | 70/432 X |
| 4,823,633 | 4/1989 | Pike | 74/411.5 |
| 4,827,787 | 5/1989 | Gillingham et al. | 74/411.5 |

Primary Examiner—Allan D. Herrmann
Assistant Examiner—David W. Laub
Attorney, Agent, or Firm—Pearne, Gordon, McCoy & Granger

[57] ABSTRACT

A gear train locking device is inserted into an opening in the housing adjacent to the gear to be locked. The device is made in a two-piece assembly to permit the device to be threaded into the opening while maintaining the proper orientation of the engaging slot on the forward end of the device which engages the teeth of the gear. To assist in determining that the proper orientation has been maintained, alignment indicating means, preferably in the form of a notch, are provided in the rearward end of the device. The device allows a gear to be locked without the need of disassembling the actuator or motor in which the gear train is located. With the gear on the input shaft locked, torque can be applied to the output shaft to easily accomplish the tests of gear train performance, minimizing the time and complexity of the tests.

9 Claims, 2 Drawing Sheets

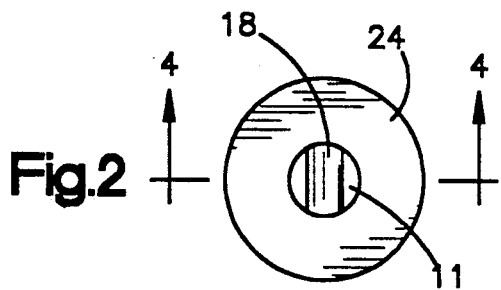
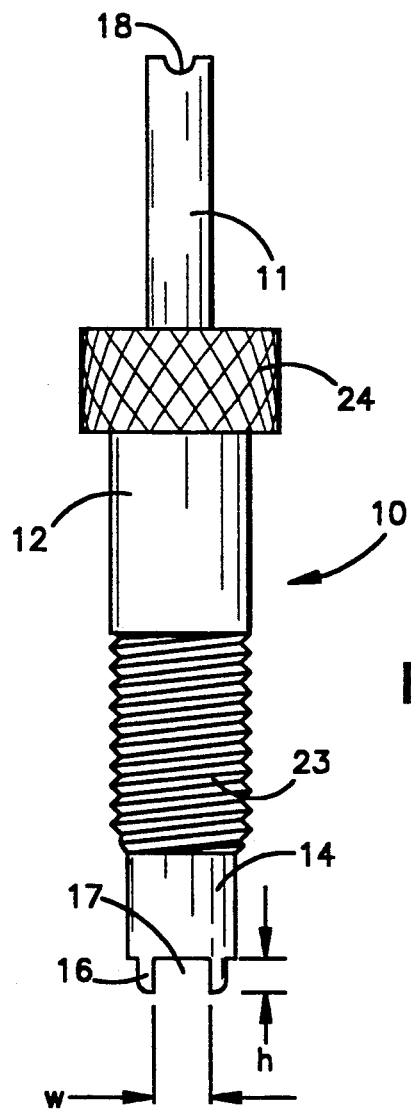
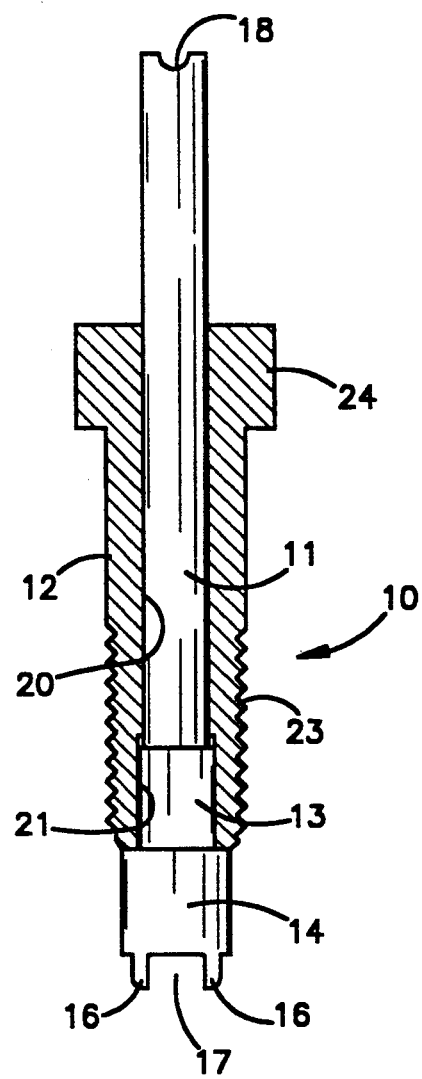
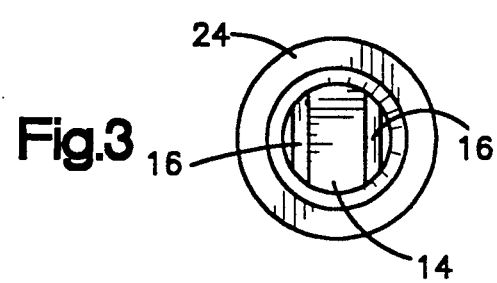

LOCKING DEVICE FOR A GEAR TRAIN

BACKGROUND OF THE INVENTION

1. Field of the Invention

This invention relates means for locking a gear train, and more particular to a removable locking device for use in measuring gear train performance.

2. Description of the Prior Art

To investigate the performance of a gear train used in an actuator, the backlash and stiffness of the gear train may be checked during qualification and acceptance testing of the actuator. This testing is accomplished by locking the input shaft to the gear train. Torque is then applied to the output shaft of the actuator and the resulting deflections of the output shaft relative to the input shaft are measured.

In order to lock the input shaft, it usually necessary to disassemble the actuator so that access to the input shaft can be obtained and so that the input shaft can be securely locked. Because disassembly is necessary, this test is somewhat complex and time-consuming.

It would be advantageous to have the capability of performing an investigation of gear train performance without disassembling the actuator. However, some means must be found for securing the input shaft in the gear train so that the torque can be applied to the output shaft to measure backlash and stiffness.

SUMMARY OF THE INVENTION

The present invention overcomes the problems of the prior art and provides advantages heretofore not obtained. The present invention provides a means for locking the input shaft of an actuator or motor without the necessity of disassembling the actuator or motor.

The present invention provides a locking device which can be inserted into the housing of the actuator or motor to lock the input shaft, avoiding the need to disassemble the actuator or motor. Using the device of the present invention, the input shaft can be easily and quickly locked so that torque can be applied to the output shaft to facilitate the tests of gear train performance. The time and complexity of the tests are thereby minimized, and gear train performance can be measured more rapidly than was possible heretofore.

The present invention accomplishes the gear locking quickly and easily using a gear train locking device which is inserted into a corresponding opening in the housing adjacent to the gear to be locked. The device is made in a two-piece assembly to permit the device to be threaded into the opening while maintaining the proper orientation of the engaging slot on the forward end of the device which engages the teeth of the gear. To assist in determining that the proper orientation has been maintained, alignment indicating means, preferably in the form of a notch, are provided in the rearward end of the device.

These and other advantages are achieved by the present invention of a locking device for a gear train. The locking device comprises a central member having a locking slot positioned on its forward end. The locking slot is adapted to engage the tooth of a gear. The central member also has an alignment indicating means for determining the orientation of the locking slot. The locking device also comprises an outer sleeve around the central member. The outer sleeve has a threaded portion for insertion into a threaded opening adjacent to a portion of the gear train. The outer sleeve also has a head for driving the sleeve into the opening.

Preferably, the central member is free to rotate within the outer sleeve, so that the central member can be positioned in proper orientation as the sleeve is rotated and driven into the threaded opening. The central member preferably has a pair of protruding fingers on its forward end, the locking slot being formed between the fingers. The alignment indicating means preferably comprises a notch on the rearward end of the central member, and the notch preferably extends radially parallel to the locking slot, so that the orientation of the locking slot can be easily determined.

BRIEF DESCRIPTION OF THE DRAWINGS

FIG. 1 is a side elevational view of the gear train locking device of the present invention.

FIG. 2 is a top plan view of the gear train locking device of FIG. 1.

FIG. 3 is a bottom plan view of the gear train locking device of FIG. 1.

FIG. 4 is a side sectional view of the gear train locking device taken along line 4—4 of FIG. 1.

DETAILED DESCRIPTION OF THE PREFERRED EMBODIMENT

Figure 5:
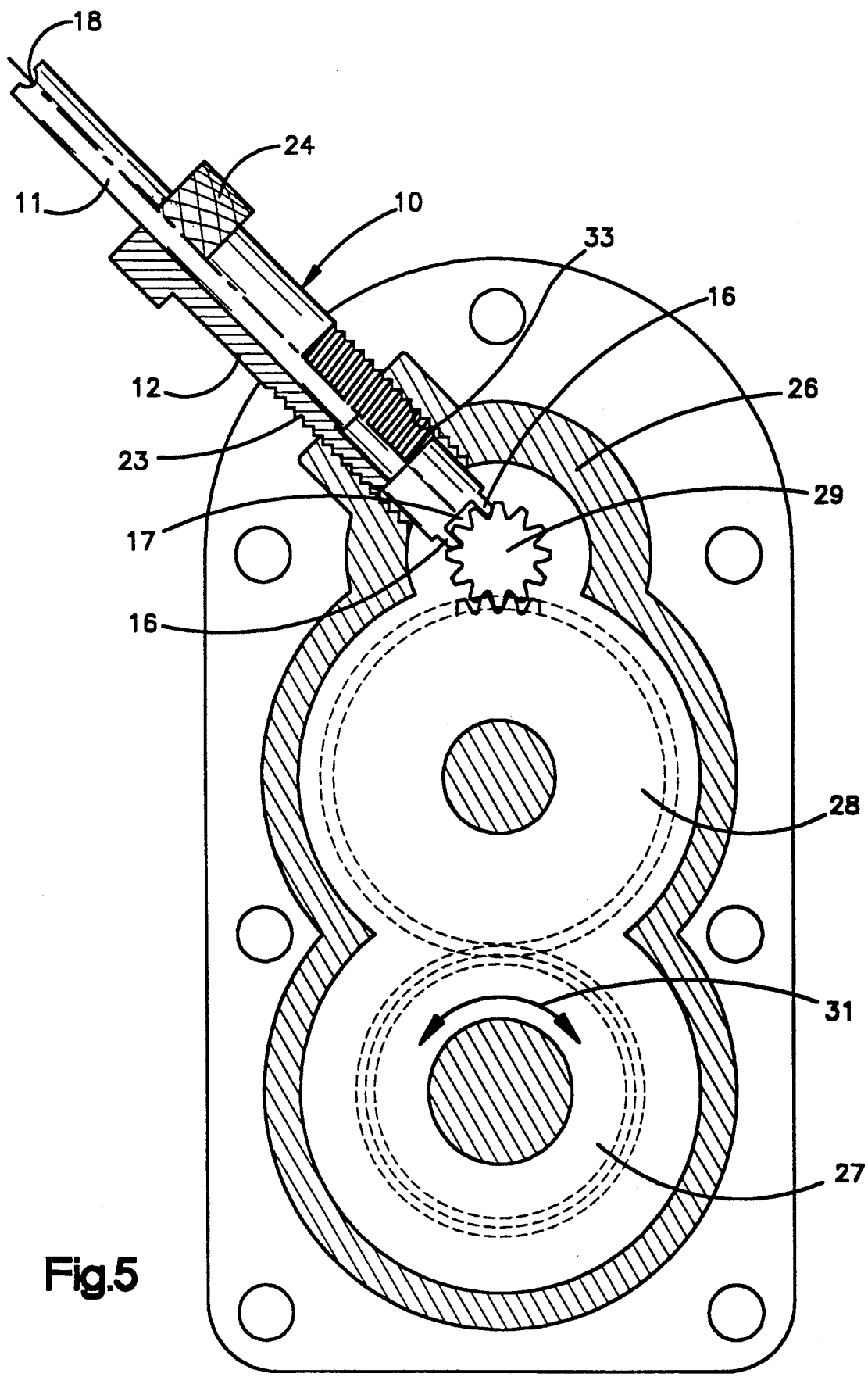
FIG. 5 is a side sectional view of a gear train showing the locking device of FIGS. 1-4 in its locking position.

Referring more particularly to the drawings and initially to FIGS. 1-4, there is shown the gear train locking device 10 of the present invention. The locking device 10 comprises a central member in the form of an elongated cylindrical inner rod 11 mounted within an outer sleeve 12. At the forward end of the rod 11 is an enlarged transition portion 13 and a further enlarged base portion 14. The transition portion 13 is located with in the outer sleeve 12, and the base portion 14 forms the forward end of the rod 11 that extends from the outer sleeve 12.

On the forward tip of the base portion 14 are a pair of protruding fingers 16. The fingers 16 extend parallel to each other forming a slot 17 between the fingers. The fingers 16 are intended to engage the teeth of a gear and are configured in accordance with the thread of the gear being locked as will be more fully described below. The rod 11 also has a radially extending notch 18 at the rearward end of the rod 11, that is, the end of the rod opposite the fingers 16. The notch 18 extends in the same radial direction as the fingers 16 and the slot 17 and is used as a visual alignment element to determine the radial position or alignment of the fingers and the slot.

The outer sleeve 12 has an inner bore 20 dimensioned to accommodate the inner rod 11, and the inner rod 11 is free to rotate within the outer sleeve 12. At its forward end, the bore 20 includes an enlarged portion 21 within which fits the transition portion 13 of the rod 11.

The outer sleeve 12 includes a threaded portion 23 at its forward end adjacent to the base portion 14 of the rod 11, and an enlarged head 24 at the rearward end. The sleeve head 24 may have an knurled outer surface or may be hexagonal shaped so that the head can be engaged by a driving tool, such as a wrench or pliers, to rotate or turn the sleeve. The device 10 may then be threaded into a corresponding threaded opening by using the head 24 to turn the sleeve so that the threaded portion 23 engages the corresponding threads in the opening.

The operation and use of the gear train locking device 10 of the present invention may be understood with reference to FIG. 5, which shows a typical gear train as may be provided in an actuator or motor. The gear train locking device 10 is inserted into the gear train as shown in FIG. 5. The gear train may be located in a housing 26 and may comprise a main gear 27 which is mounted on the output shaft on the actuator. The main gear 27 engages an idler gear 28 which in turn engages a pinion 29. The pinion 29 is mounted on the input shaft of the gear train.

To investigate the performance of the gear train in the actuator, the backlash and stiffness of the gear train are checked during qualification and acceptance testing of the actuator. This testing is accomplished by locking the input shaft to the gear train using the device 10 to lock the pinion 29, and applying torque to the output shaft of the actuator, as shown by the arrow 31 in FIG. 5. The resulting deflections of the output shaft relative to the input shaft are then measured.

To accommodate the locking device 10, the housing 26 is provided with a threaded opening 33 adjacent to the pinion 29. To lock the pinion 29 on the input shaft, the gear train locking device 10 is positioned adjacent to the opening 33 with the fingers 16 in position to engage the teeth of the pinion 29. The device 10 is then inserted into the opening 33 by engaging the head 24 with a wrench or other suitable tool so that the sleeve 12 turns and the threaded portion 23 engages the threads in the opening 33. The sleeve 12 continues to rotate until the device 10 is substantially inserted into the opening 33 and the fingers 16 are about to engage the teeth of the pinion 29. At this point, the rod 11 is turned and positioned so that the fingers are properly oriented to engage the teeth of the pinion 29. This positioning is accomplished by rotating the rod 11 until the fingers 16 are in the proper orientation, using the notch 18 as a visual alignment guide, since the notch extends in the same radial direction as the fingers 16. The notch 18 may also be used to assist in turning or holding the rod in position, such as by engaging the notch with a screwdriver or other suitable tool. With the fingers 16 in the proper orientation, the sleeve 12 is further turned to advance the device 10 further into the opening 33 while the rod 11 is kept from rotating and held in position until the fingers 16 engage the teeth of the pinion 29.

With the pinion 29 and the input shaft locked in place, torque can be applied to the output shaft, and the resulting deflections of the output shaft can be used to measure the backlash and stiffness of the gear train. While the locking device 10 remains in place, the notch 18 on the rod 11 is used for visual inspection to insure that the locking device is properly inserted and locked in place and that the pinion 29 is not turning. Following the testing, the gear train locking device 10, is removed from the threaded opening 33. The opening 33 can then be plugged, as desired, to prevent undesirable substances from entering the interior of the housing 26.

As previously noted, the fingers 16 are configured in accordance with the thread of the gear being locked. The gear train locking device 10 can be used to lock virtually any spur gear by simply changing the finger size to coincide with the diametral pitch of the gear. The head 24 of the rod 11 may be made so that it is removable from the rod so that the head and the fingers 16 can be conveniently changed to accommodate different sized gears.

The width and height of the locking slot 17 are sized in accordance with the following formulae:

$$w = d\left(\sin\frac{\theta}{2} + t\right)$$

$$\theta = 360\frac{L}{\pi d}$$

$$L = \frac{3}{2 p_C}$$

$$p_c = \frac{\pi d}{n} = \frac{\pi}{p_D}$$

$$h = \frac{4}{3}\left(\frac{2.2}{p_D}\right) \text{minimum}$$

where
- w is the distance between the fingers 16 or the width of the slot 17;
- h is the height of the fingers 16;
- d is the pitch diameter of the gear being locked;
- $p_C$ is the circular pitch of the gear being locked;
- $p_D$ is the diametral pitch of the gear being locked; and
- n is the total number of gear teeth on the gear being locked;
- t is a small tolerance distance, and preferably about 0.002 inches.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way this is inconsistent with the extent to which the progress in the art has been advance by the invention.

| REFERENCE NUMBERS | |
| --- | --- |
| 10 | locking device |
| 11 | rod |
| 12 | sleeve |
| 13 | transition portion |
| 14 | base portion |
| 15 | |
| 16 | fingers |
| 17 | slot |
| 18 | notch |
| 19 | |
| 20 | bore |
| 21 | enlarged portion |
| 22 | |
| 23 | threaded portion |
| 24 | head |
| 25 | |
| 26 | housing |
| 27 | main gear |
| 28 | idler gear |
| 29 | pinion |
| 30 | |
| 31 | arrow |
| 32 | |
| 33 | opening |
| 34 | |
| 35 | |
| 36 | |
| 37 | |
| 38 | |

-continued

| REFERENCE NUMBERS |
| --- |
| 39 |
| 40 |
| 41 |
| 42 |
| 43 |
| 44 |
| 45 |
| 46 |
| 47 |
| 48 |
| 49 |
| 50 |
| 51 |
| 52 |
| 53 |
| 54 |
| 55 |
| 56 |
| 57 |
| 58 |
| 59 |
| 60 |
| 61 |
| 62 |
| 63 |

What is claimed is:

1. A locking device for a gear train, which comprises:
an elongated central member adapted to extend generally radially toward a gear to be locked, the central member having a locking slot positioned on its forward end, the locking slot adapted to engage a plurality of teeth of the gear, the central member also having an alignment indicating means for determining the orientation of the locking slot; and
an outer sleeve around the central member, the outer sleeve having a threaded portion for insertion into a threaded opening adjacent to the gear, the outer sleeve also having a head for driving the sleeve into the threaded opening.

2. The device for locking a gear train as defined in claim 1, wherein the central member is free to rotate within the outer sleeve to allow the central member to be positioned in proper orientation as the sleeve is rotated and driven into the threaded opening.

3. The device for locking a gear train as defined in claim 1, wherein the central member has a pair of protruding fingers on its forward end, the locking slot being formed between the fingers.

4. The device for locking a gear train as defined in claim 1, wherein the alignment indicating means comprises a notch on the rearward end of the central member.

5. The device for locking a gear train as defined in claim 4, wherein the notch extends radially parallel to the locking slot to facilitate determination of the orientation of the locking slot.

6. A locking device for a gear train, which comprises:
a generally cylindrical central rod adapted to extend generally radially toward a gear to be locked, the rod having a pair of protruding fingers positioned on its forward end, a locking slot being formed between the fingers, the locking slot adapted to engage a plurality of teeth of the gear, the rod also having a radially extending notch on the rearward end, the notch extending radially parallel to the locking slot and providing an alignment indicating means for determining the orientation of the locking slot; and
an outer sleeve around the rod, the rod being free to rotate within the outer sleeve, the outer sleeve having a threaded portion for insertion into a threaded opening adjacent to the gear, the outer sleeve also having a head for rotating and driving the sleeve into the opening.

7. A lockable gear train assembly, comprising:
a gear housing;
a gear within the gear housing, the gear housing having a threaded opening adjacent to the location of the gear; and
a locking device for insertion into the threaded opening, the locking device comprising
an elongated central member extending generally radially toward the gear, the central member having a locking slot positioned on its forward end, the locking slot adapted to engage a plurality of teeth of the gear, the central member also having an alignment indicating means for determining the orientation of the locking slot, and
an outer sleeve around the central member, the outer sleeve having a threaded portion for insertion into the threaded opening, the outer sleeve also having a head for driving the sleeve into the threaded opening.

8. The device for locking a gear train as defined in claim 1, wherein the central member is adapted to engage gear teeth on either side of the plurality of teeth engaged by the locking slot.

9. The device for locking a gear train as defined in claim 3, wherein the protruding fingers are substantially parallel to each other.

* * * * *

UNITED STATES PATENT AND TRADEMARK OFFICE
CERTIFICATE OF CORRECTION

PATENT NO. : 5,157,983

DATED : October 27, 1992

INVENTOR(S) : John R. Sankovic

It is certified that error appears in the above-identified patent and that said Letters Patent is hereby corrected as shown below:

Column 4, lines 5-7, "$w = d(\sin \frac{\theta}{2} + t)$" should be --$w = d(\sin \frac{\theta}{2}) + t$--.

Signed and Sealed this

Twenty-sixth Day of October, 1993

Attest:

BRUCE LEHMAN

Attesting Officer

Commissioner of Patents and Trademarks